No. 700,398. Patented May 20, 1902.
L. AMBLER.
CULINARY VESSEL.
(Application filed Nov. 12, 1901.)
(No Model.)
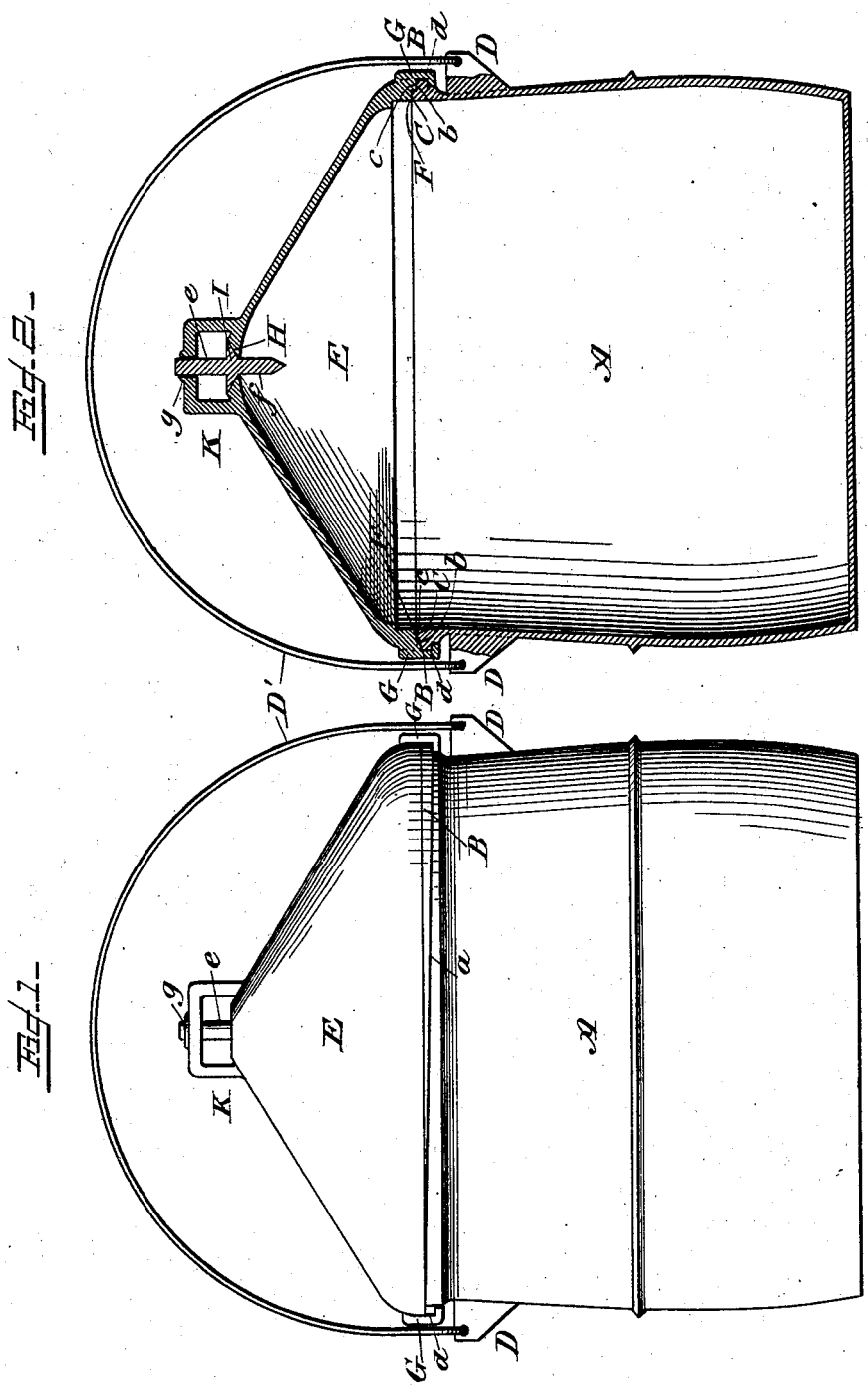
Witnesses
F. L. Ourand
W. Parker Reinohl
Inventor
Levi Ambler
by D. R. Reinohl
Attorney
THE NORRIS PETERS CO., PHOTO-LITHO., WASHINGTON, D. C.

UNITED STATES PATENT OFFICE.

LEVI AMBLER, OF LEBANON, PENNSYLVANIA.

CULINARY VESSEL.

SPECIFICATION forming part of Letters Patent No. 700,398, dated May 20, 1902.

Application filed November 12, 1901. Serial No. 81,971. (No model.)

*To all whom it may concern:*

Be it known that I, LEVI AMBLER, a citizen of the United States, residing at Lebanon, in the county of Lebanon and State of Pennsylvania, have invented certain new and useful Improvements in Culinary Vessels; and I do hereby declare the following to be a full, clear, and exact description of the invention, such as will enable others skilled in the art to which it appertains to make and use the same.

My invention relates to culinary vessels, and has for its object the making of a hermetically-sealed vessel to prevent the overflowing of the vessel and to confine the heat therein.

In the accompanying drawings, which form part of this specification, Figure 1 is a side elevation of my improved vessel, and Fig. 2 a vertical transverse section of the same.

Reference being had to the drawings and the letters thereon, A is the body of the vessel, provided with concentric projections B B, having an inclined or tapered side a, each of which projections extend nearly half-way around the vessel. On the upper edge of the vessel A is a seat C, which is turned true on a lathe or otherwise finished to make a tight joint and having a rabbet b between the upper edge of the projection B and the seat to receive the overhanging portion of a cover, and adjacent to the projections B are the lugs or ears D, to which the bail or handle D' is attached.

E is the cover of the vessel, having a seat F on the under edge thereof to engage with the seat C on the upper edge of the vessel and is likewise turned or finished to make a tight joint between the cover and the vessel to prevent leaking by overflow while boiling any article in the vessel, and the cover is provided with an annular projection c, which corresponds with the rabbet b in the vessel to retain the cover on the vessel when it is not locked. On the cover E are lugs G, having recesses d therein, which engage the projections B on the vessel to securely lock the cover on the vessel by turning the cover.

In the crown of the cover E is a valve-seat H, on which a relief-valve I is seated, with part of the valve-stem e above and part of the valve-stem f below the valve.

K is a handle on the cover, forming a yoke, in the center of which is a hole g, through which the upper part e of the valve-stem projects to guide the valve to its seat.

In the use of the vessel for baking, roasting, or the like all the heat is retained or confined in the vessel, and in boiling or steaming the heat is confined until the steam acquires sufficient pressure to raise the valve I automatically and relieve the vessel of excessive pressure to prevent danger by explosion, and when relieved the valve again gravitates to its seat and prevents the waste of steam until the pressure again becomes excessive and raises the valve.

Having thus fully described my invention, what I claim is—

A hermetically-closed culinary vessel having a smooth seat on its upper end forming one member of a tight joint, a rabbet adjacent thereto, and an external concentric projection adjacent to said seat and inclined on its lower edge; in combination with a cover having a seat forming the opposite member of said joint, an annular projection engaging said rabbet on the vessel, and lugs projecting from the cover and engaging the inclined edge of said concentric projection.

In testimony whereof I affix my signature in presence of two witnesses.

LEVI AMBLER.

Witnesses:
F. B. RUTTER,
DAVID C. SMITH.